US008866587B2

(12) United States Patent
Chang

(10) Patent No.: US 8,866,587 B2
(45) Date of Patent: Oct. 21, 2014

(54) REMOTE DISPLAY CONTROL

(75) Inventor: Young-Tae Chang, Seoul (KR)

(73) Assignee: Empire Technology Development LLC, Wilmington, DE (US)

( * ) Notice: Subject to any disclaimer, the term of this patent is extended or adjusted under 35 U.S.C. 154(b) by 573 days.

(21) Appl. No.: 12/999,130

(22) PCT Filed: Aug. 17, 2010

(86) PCT No.: PCT/US2010/045780
§ 371 (c)(1),
(2), (4) Date: Dec. 15, 2010

(87) PCT Pub. No.: WO2012/023930
PCT Pub. Date: Feb. 23, 2012

(65) Prior Publication Data
US 2012/0044051 A1    Feb. 23, 2012

(51) Int. Cl.
G06F 7/04        (2006.01)
H04N 21/4223     (2011.01)
H04N 21/422      (2011.01)
G06F 1/16        (2006.01)
H04N 21/436      (2011.01)
H04N 21/4415     (2011.01)
H04N 21/41       (2011.01)

(52) U.S. Cl.
CPC ..... *H04N 21/43615* (2013.01); *H04N 21/4223* (2013.01); *H04N 21/42204* (2013.01); *G06F 1/1626* (2013.01); *G06F 1/1698* (2013.01); *H04N 21/4415* (2013.01); *H04N 21/4126* (2013.01)
USPC ............. 340/5.83; 340/3.1; 340/1.1; 382/118

(58) Field of Classification Search
USPC .................................. 340/5.83, 3.1; 382/118
See application file for complete search history.

(56) References Cited

U.S. PATENT DOCUMENTS

| 6,882,741 | B2 | 4/2005 | Dobasji et al. | |
| 7,130,454 | B1* | 10/2006 | Berube et al. | 382/118 |
| 7,132,058 | B2* | 11/2006 | Thomas et al. | 252/79.1 |
| 7,162,058 | B2* | 1/2007 | Mimura et al. | 382/124 |
| 7,188,139 | B1 | 3/2007 | Ayatsuka et al. | |
| 7,634,662 | B2 | 12/2009 | Monroe | |

(Continued)

FOREIGN PATENT DOCUMENTS

| JP | 3154529 | 9/2009 |
| JP | 2010-068385 | 3/2010 |

(Continued)

OTHER PUBLICATIONS

Kisters et al. WO2010075921A2 Publication Date: Jul. 8, 2010 (machine translation).*

(Continued)

*Primary Examiner* — George Bugg
*Assistant Examiner* — Naomi Small
(74) *Attorney, Agent, or Firm* — Dorsey & Whitney LLP

(57) ABSTRACT

Technologies are generally described for controlling remote display. In some examples, a method for controlling a remote display device using a handheld computing device includes receiving, by a handheld computing device, one or more data from one or more remote display devices over a wireless communication network, selecting a remote display device based on the received data and sending a control signal to the selected remote display device.

17 Claims, 5 Drawing Sheets

100

(56) References Cited

U.S. PATENT DOCUMENTS

| | | | |
|---|---|---|---|
| 8,160,568 B2 | 4/2012 | Kim et al. | |
| 2004/0208588 A1 | 10/2004 | Colmenarez et al. | |
| 2006/0280445 A1 | 12/2006 | Masaki et al. | |
| 2006/0282682 A1 | 12/2006 | Masaki et al. | |
| 2007/0019000 A1 | 1/2007 | Motomura et al. | |
| 2007/0057763 A1* | 3/2007 | Blattner et al. | 340/5.52 |
| 2007/0188597 A1 | 8/2007 | Kenoyer | |
| 2008/0018487 A1* | 1/2008 | Jao et al. | 340/693.12 |
| 2008/0117299 A1 | 5/2008 | Carter | |
| 2008/0317349 A1* | 12/2008 | Ishikawa | 382/190 |
| 2009/0054050 A1* | 2/2009 | Almeda et al. | 455/419 |
| 2011/0072355 A1* | 3/2011 | Carter et al. | 715/738 |

FOREIGN PATENT DOCUMENTS

| | | |
|---|---|---|
| KR | 20050074248 A | 7/2005 |
| KR | 10-2009-012344 A | 12/2009 |
| KR | 20090123440 A | 12/2009 |
| WO | WO 2010075921 A2 * | 7/2010 |

OTHER PUBLICATIONS

MobiLenin, "Projects", www.mobilenin.com, © 2009, Accessed on Nov. 30, 2010, 4 pages.

MobiLenin, "The MobiLenin System", www.leninsgodson.com, © 2004, Last Updated on Oct. 29, 2004, Accessed on Nov. 30, 2010, 4 pages.

Rohs et al., "Direct manipulation Techniques for Large Display Using Camera Phones", Proceedings of the $2^{nd}$ International Symposium on Ubiquitous Computing Systems (USC2004), Nov. 8-9, 2004, Tokyo, Japan, 2 pages.

Scheible and Ojala, "MobiLenin—Combining a Multi-Track Music Video, Personal Mobile Phones and a Public Display Into Multi-User Interactive Entertainment", Multimedia '05 Proceedings of the 13th annual ACM international conference on Multimedia, Hilton, Singapore, Nov. 6-11, 2005, 199-208.

International Search Report and Written Opinion for International Application No. PCT/US2010/045780, ISA/US, mailed on Oct. 7, 2010, 10 pages.

* cited by examiner

REMOTE DISPLAY CONTROL

CROSS-REFERENCE TO RELATED APPLICATIONS

This application is the National Stage of International Application No. PCT/US2010/045780, filed Aug. 17, 2010, the disclosure of which is incorporated herein by reference in its entirety.

BACKGROUND

Unless otherwise indicated herein, the materials described in this section are not prior art to the claims in this application and are not admitted to be prior art by inclusion in this section.

Portable electronic devices, including hand-held devices such as cellular phones and personal digital assistants (PDAs), by their nature have limited display capabilities primarily due to the small size of the display screen. Recent prevalent use and availability of public display devices, combined with the ubiquitous availability of high-speed network connectivity, contribute to the increased demand by portable electronic device users for displays having better resolution and larger size. In order to use a public display device, the user needs access to a suitable input device such as a keyboard, mouse, or touch screen interface, etc. in order to control the display device. However, for various reasons including economic and sanitary reasons, it is not feasible for the public display devices to have associated input devices.

SUMMARY

In an example, a method for controlling a remote display device using a handheld computing device includes receiving, by a handheld computing device, one or more data from one or more remote display devices over a wireless communication network, selecting a remote display device based on the received one or more data, and sending a control signal to the selected remote display device.

In another example, a handheld computing device includes a receiver, a face recognizer, a selector, and a display device controller. The receiver receives one or more images from one or more remote display devices over a wireless communication network. The face recognizer extracts facial information from each of the received images. The selector selects a remote display device based on a comparison of the extracted facial information from each of the received images with facial information stored on the handheld computing device. The display device controller transmits a control signal to the selected remote display device.

In still another example, a computing device includes a receiver, a selector, and a display device controller. The receiver receives one or more facial information from one or more remote display devices over a wireless communication network. The selector selects a remote display device based on a match of the facial information sent by the one or more remote display devices and facial information stored on the computing device. The display device controller sends a control signal to the selected remote display device.

In an example, a display device includes an image capturer, a transmitter, and a controller. The image capturer captures an image with a camera. The transmitter transmits the image for reception by a handheld computing device. The controller receives a control signal from the handheld computing device, and controls the display device based on the control signal.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE FIGURES

The foregoing and other features of this disclosure will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings, in which:

Figure 1:
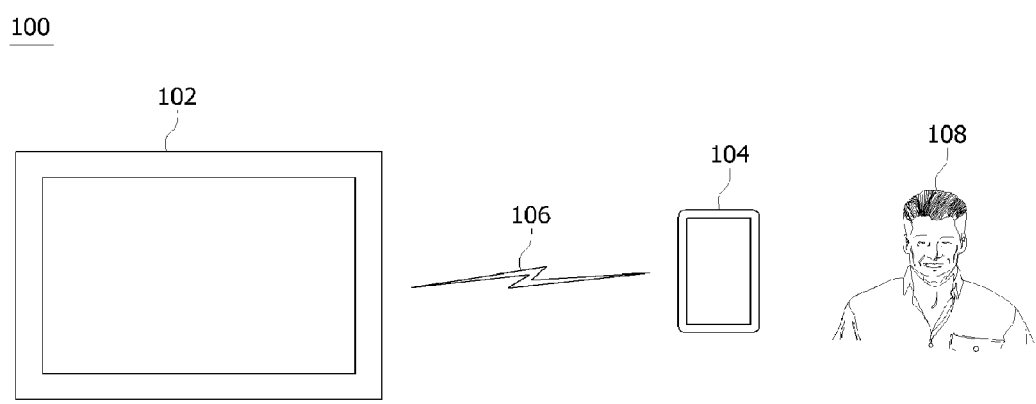
FIG. 1 illustrates some example systems that can be utilized to implement remote display control.

all arranged according to at least some embodiments described herein.

DETAILED DESCRIPTION

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented herein. It will be readily understood that the aspects of the present disclosure, as generally described herein, and illustrated in the Figures, can be arranged, substituted, combined, separated, and designed in a wide variety of different configurations, all of which are explicitly contemplated herein.

This disclosure is generally drawn, inter alia, to methods, apparatus, systems, devices, and computer program products related to remote display control.

Briefly stated, technologies are generally described for remotely controlling a display using a handheld computing device. In some examples, the display includes a display area. In some examples, a method for remotely controlling the display includes receiving data from one or more remote display devices over a wireless communication network. In some examples, the method includes selecting a remote display device based on the received data. In some examples, the method includes sending a control signal to the selected remote display device.

FIG. 1 illustrates some example systems that can be utilized to implement remote display control arranged according to at least some embodiments described herein. As depicted, a remote display control system 100 includes a display device 102 and a handheld computing device 104 in communication through a wireless communication network 106.

Display device 102 is an output device that displays visual content. Broadly, visual content may include an image, video, animation, web page, or any kind of content which can be visualized on screen. Display device 102 includes a wireless communication component or medium for connecting to and communicating with handheld computing device 104 and receives a control signal from handheld computing device 104 through the wireless communication component or medium. In some examples, the control signal may include control command for changing channel or audio volume of display device 102, adjusting settings, moving a cursor, typing symbols or characters, etc.

Display device 102 also includes an image capturing device, such as a camera, suitable for capturing an image of a user 108 who tries to control display device 102 using handheld computing device 104. The image capturing device may be suitably positioned to take a picture (capture an image) of the face of a person who may be facing a display screen of display device 102. Of course, if the person is not facing the display screen, for example, although the person is standing proximately in front of display device 102 but happens to be facing in a direction away from the display screen, the image capturing device may capture an image that is not of the face of the person. In some examples, using the image capturing device, display device 102 may capture an image of user 108 while user 108 is looking at the display screen, and send the captured image to handheld computing device 104 so that handheld computing device 104 can recognize a face of user 108 from the received image. In other examples, display device 102 may extract facial information from the captured image and transmit the extracted facial information instead of sending the image itself. The term "facial information" as used herein refers to information extracted from an image of a person's face for identifying or verifying the person. The facial information may include the relative position, size, or shape of the eyes, nose, cheekbones, or jaw of a recognized face from the image.

Handheld computing device 104 is a device that is suitable to control display device 102. In other words, handheld computing device 104 may function as a remote control device of display device 102. Examples of handheld computing device 104 include, without limitation, mobile or portable communications devices such as cell phones, smart phones, personal digital assistants (PDAs), tablet PCs, etc. Handheld computing device 104 includes a wireless communication component or medium for communication with display device 102.

In some examples, there may be more than one display device located within the communication range of handheld computing device 104. In this case, handheld computing device 104 is configured to select one display device to control based on facial recognition. Assume that three display devices (for example, display device A, B and C) are located in close proximity to each other, and user 108 wants to control display device A. While user 108 is standing near display device A and looking at (i.e., facing) the display screen of display device A, each of the display devices captures a respective image and sends the image to handheld computing device 104, respectively. Therefore, handheld computing device 104 receives multiple images from the display devices within the communication range of handheld computing device 104. However, because it is not possible for user 108 to look at or face two or more display devices simultaneously, only one image can be an image of the face of user 108. So, using facial recognition, handheld computing device 104 can determine which display device user 108 wants to control (in this case, display device A), and send a control signal to the desired display device.

In some examples, handheld computing device 104 may receive an image from display device 102 and extract facial information from the received image. When handheld computing device 104 determines that the extracted facial information matches the facial information of user 108, user 108 can control display device 102 using handheld computing device 104. A control interface may be displayed on handheld computing device 104 for controlling display device 102. In some examples, the control interface may be received from display device 102. The control interface may include predefined virtual "buttons" or "keyboards." When user 108 presses or touches one of the displayed buttons, handheld computing device 104 generates a corresponding control signal and transmits the control signal to the display device 102. In other examples, handheld computing device 104 may receive facial information which is extracted by display device 102 instead of receiving the image itself. When handheld computing device 104 receives facial information, handheld computing device 104 compares the received facial information with facial information of user 108 and determines whether the former matches the latter.

Wireless communication network 106 is a communications link that facilitates transfer of electronic content or messages between display device 102 and handheld computing device 104. In some examples, wireless communication network 106 includes a wireless personal area network which can be made possible with network technologies such as IrDA, Bluetooth, UWB, Z-Wave, or ZigBee. It will be appreciated that wireless communication network 106 may also include or be composed of one or more other types of networks, such as a local area network, a wide area network, a point-to-point dial-up connection, a cell phone network, or the like.

Figure 2:
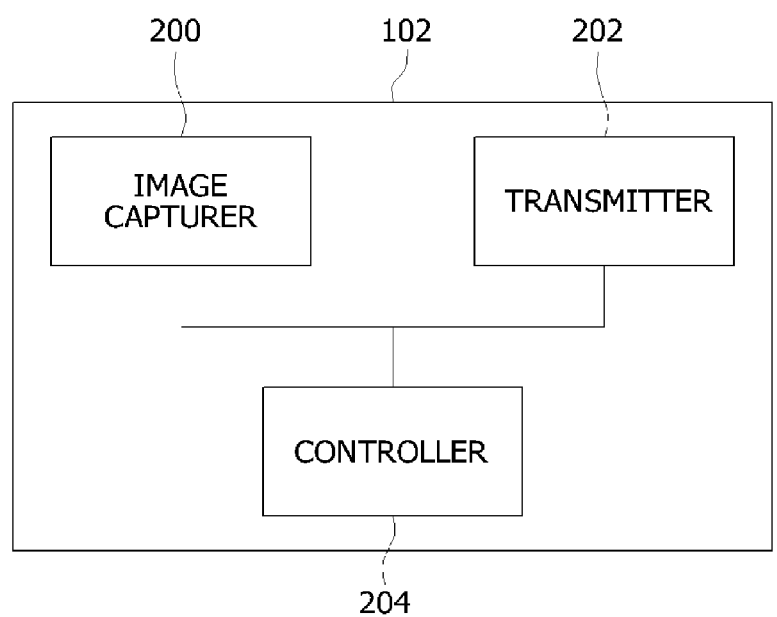
FIG. 2 illustrates an example display device shown in FIG. 1.

FIG. 2 illustrates an example of display device 102 shown in FIG. 1 arranged according to at least some embodiments described herein. As depicted, display device 102 includes an image capturer 200, a transmitter 202, and a controller 204.

Image capturer 200 captures an image using a camera. The camera may be suitably positioned to record an image of objects in front of display device 102 and, in particular, in front of the camera. For example, the camera may be positioned to take a picture of a person who is in front of a display screen of display device 102. In some examples, the camera may be located atop a display screen of display device 102 so that image capturer 200 can capture the image including a face of user 108 when user 108 stands in front of display device 102 and looks at or faces the display screen.

Transmitter 202 transmits the image that is captured by image capturer 200 for reception by handheld computing device 104 through wireless communication network 106. When transmitting the image, transmitter 202 may also transmit identification information of display device 102 in addition to the image so handheld computing device 104 can identify and connect to display device 102 based on the identification information. Examples of the identification information include, but are not limited to, a serial number, Universally Unique Identifier (UUID), IP address, MAC address, uniform resource identifier (URI), etc.

Controller 204 receives a control signal from handheld computing device 104, and controls display device 102 based on the control signal. In some examples, controller 204 may transmit a control interface suitable to control display device 102 to handheld computing device 104 so handheld computing device 104 can display the received control interface on its screen.

Figure 3:
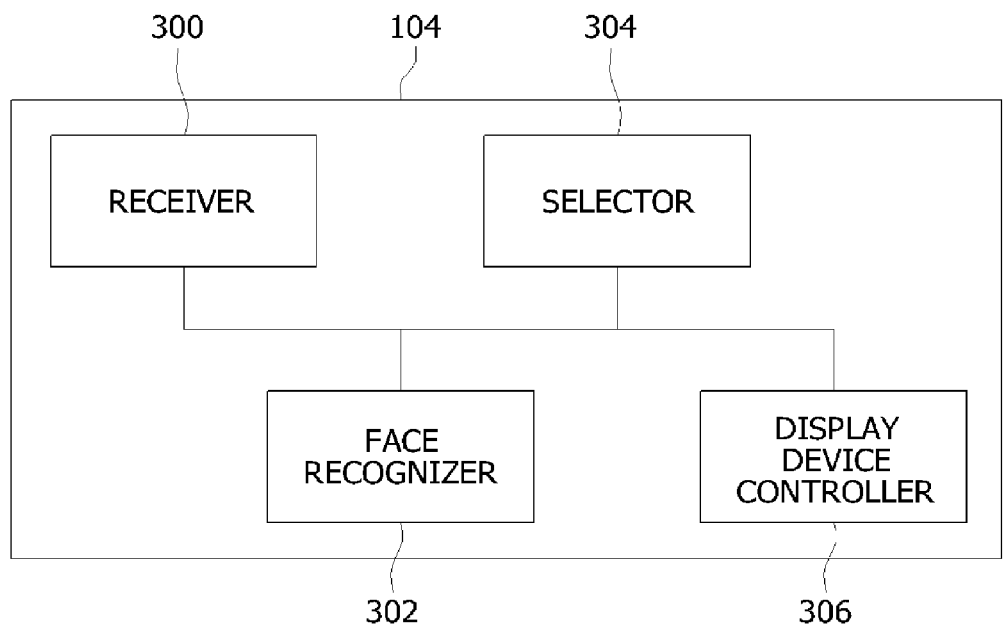
FIG. 3 illustrates an example handheld computing device shown in FIG. 1.

FIG. 3 illustrates an example handheld computing device 104 shown in FIG. 1 arranged according to at least some embodiments described herein. As depicted, handheld computing device 104 includes a receiver 300, a face recognizer 302, a selector 304, and a display device controller 306.

Receiver 300 receives an image from display device 102 over wireless communication network 106. For example, receiver 300 may receive the image when user 108 stands in front of display device 102 and looks at or faces the display screen.

In some examples, there may be more than one display device located near handheld computing device 104. Each display device uses its camera to capture an image of the person (e.g., user 108) who is standing in front of the display device. In this case, receiver 300 may receive multiple images from the display devices within the communication range of handheld computing device 104. However, since it is not possible for user 108 to look at or face two or more display devices simultaneously, only one image can contain the face image of user 108. Stated another way, at most one display device would have captured an image of the face of user 108. In the following description, assume that user 108 faces display device 102 among the multiple display devices and display device 102 captures and sends an image including face of user 108.

Face recognizer 302 extracts facial information from each of the received image. Various techniques can be applied to implement facial information extraction. For example, face recognizer 302 may determine a face region from the image based on color, shape or texture which can be detected from the image. After the face region is determined, face recognizer 302 may then extract a set of face features from the face region, for example, a position or shape of a nose, eyes or a mouth, width of mouth, width of pupil to pupil, skin color, etc.

Selector 304 compares each of the extracted facial information with facial information that is stored on handheld computing device 104. Handheld computing device 104 stores facial information of user 108 who possesses handheld computing device 104 or is allowed to use handheld computing device 104, so selector 304 can determine which of the received image includes facial information that matches the facial information of user 108. Based on the comparison, selector 304 selects the display device that transmitted the image which contained the matched facial information that matched the facial information stored on handheld computing device 104. As described above, display device 102 may send identification information to handheld computing device 104 when transmitting the image, so selector 304 can use the identification information to identify the selected display device.

Display device controller 306 sends a control signal to the selected display device. In the above example, the selected display device may be display device 102. Prior to sending the control signal to display device 102, handheld computing device 104 may send a message to request a control interface suitable to control display device 102 to display device 102, and receive the requested control interface suitable in return. After receiving the control interface, handheld computing device 104 displays the control interface on the display of handheld computing device 104. When user 108 operates the control interface, handheld computing device 104 can generate a corresponding control signal and send the control signal to display device 102. In some embodiments, control interfaces for various display devices may be preloaded or stored on handheld computing device 104.

Figure 4:
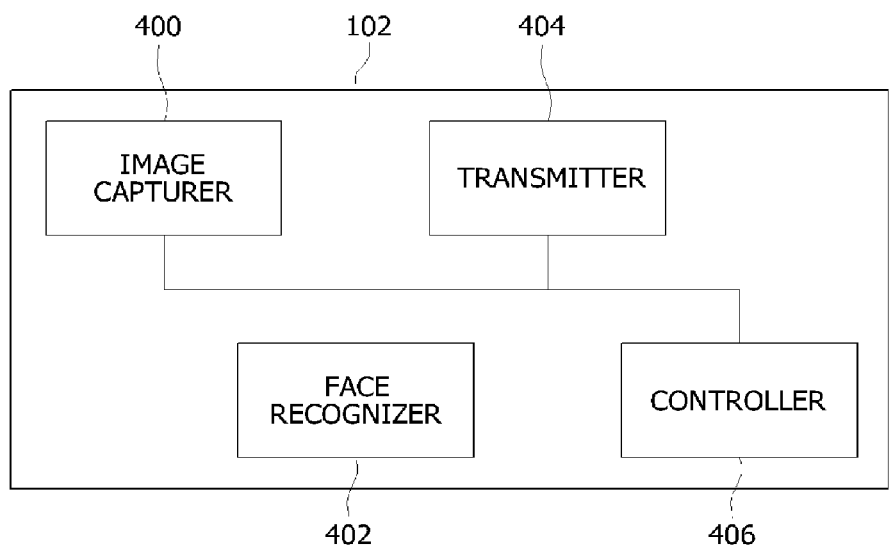
FIG. 4 illustrates another example display device shown in FIG. 1.

FIG. 4 illustrates another example display device 102 shown in FIG. 1 arranged according to at least some embodiments described herein. As depicted, display device 102 includes an image capturer 400, a face recognizer 402, a transmitter 404, and a controller 406. Image capturer 400 and controller 406 are substantially similar to image capturer 200 and controller 204, respectively, described above. Accordingly, image capturer 400 and controller 406 will not be described again for the purposes of clarity.

Face recognizer 402 extracts facial information from the captured image.

Transmitter 404 transmits the extracted facial information for reception by handheld computing device 104 through wireless communication network 106. As mentioned above in FIG. 2, transmitter 404 may also transmit identification information of display device 102 in addition to the image so handheld computing device 104 can identify and connect to display device 102 based on the identification information.

Figure 5:
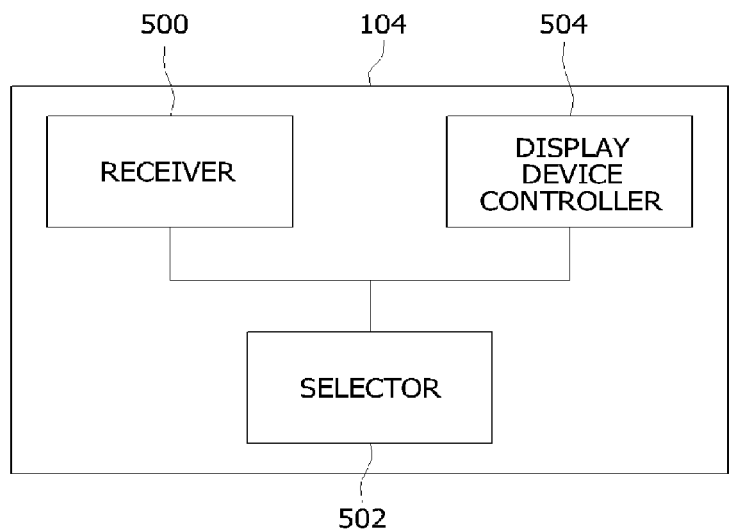
FIG. 5 illustrates another example handheld computing device shown in FIG. 1.

FIG. 5 illustrates some example embodiments of handheld computing device 104 shown in FIG. 1 arranged according to at least some embodiments described herein. As depicted, handheld computing device 104 includes a receiver 500, a selector 502, and a display device controller 504. Display device controller 504 is substantially similar to display device controller 306 described above. Accordingly, display device controller 504 will not be described again for the purposes of clarity.

Receiver 500 receives facial information from display device 102 over wireless communication network 106.

Selector 502 compares each of the received facial information with facial information that is stored on the handheld computing device 104. Handheld computing device 104 stores facial information of user 108 who possesses handheld computing device 104 or is allowed to use handheld computing device 104, so selector 502 can determine which of the received image includes facial information that matches the facial information of user 108. Based on the comparison, selector 502 selects the display device that transmitted the facial information that matched the facial information stored on handheld computing device 104. As described above, display device 102 may send identification information to handheld computing device 104 when transmitting the image, so selector 502 can use the identification information to identify the selected display device.

Figure 6:
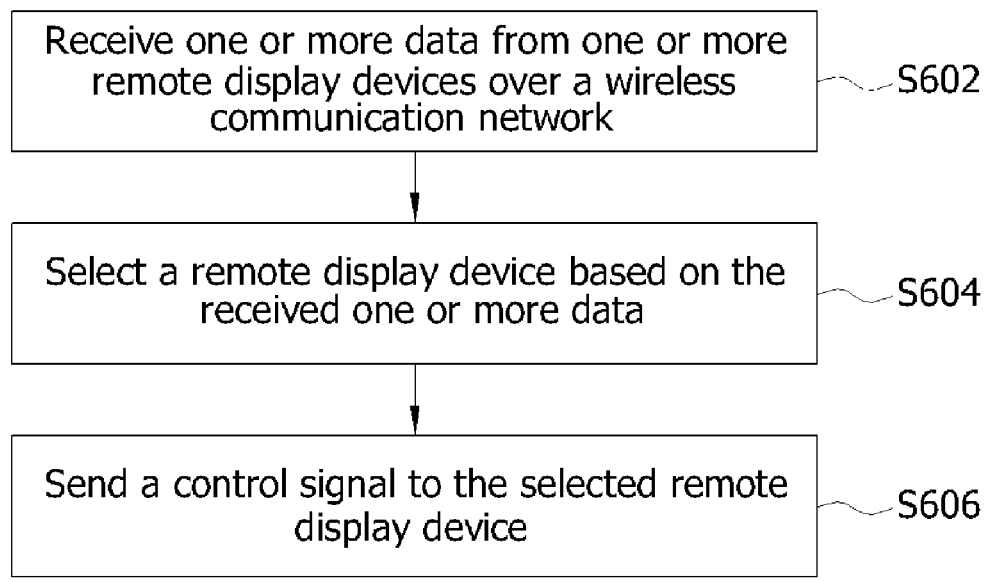
FIG. 6 depicts a flow diagram for an example process for implementing remote display control.

FIG. 6 depicts a flow diagram for an example process for implementing remote display control in accordance with at least some embodiments described herein. The process in FIG. 6 could be implemented using, for example, handheld computing device 104 discussed above. An example process may include one or more operations, actions, or functions as illustrated by one or more of blocks S602, S604 and/or S606. Although illustrated as discrete blocks, various blocks may be divided into additional blocks, combined into fewer blocks, or eliminated, depending on the desired implementation. Processing may begin at block S602.

At block S602, a handheld computing device may be configured to receive one or more data from one or more remote display devices over a wireless communication network. In some embodiments, the received data includes an image of a person, such as user 108 discussed above, that was captured by each of the one or more display devices. In other embodiments, the received data may be facial information of a person whose image was captured by each of the one or more display devices. Processing may continue from block S602 to block S604.

At block S604, the handheld computing device may be configured to select a remote display device based on the received one or more data. The selection of the appropriate remote display device is based on a comparison of the data received from each of the remote display devices and the facial information stored on the handheld computing device. Where the data is not facial information, the handheld computing device may need to extract the facial information from the received data. Processing may continue from block S604 to S606.

At block S606, the handheld computing device may be configured to send a control signal to the selected remote display device.

Figure 7:
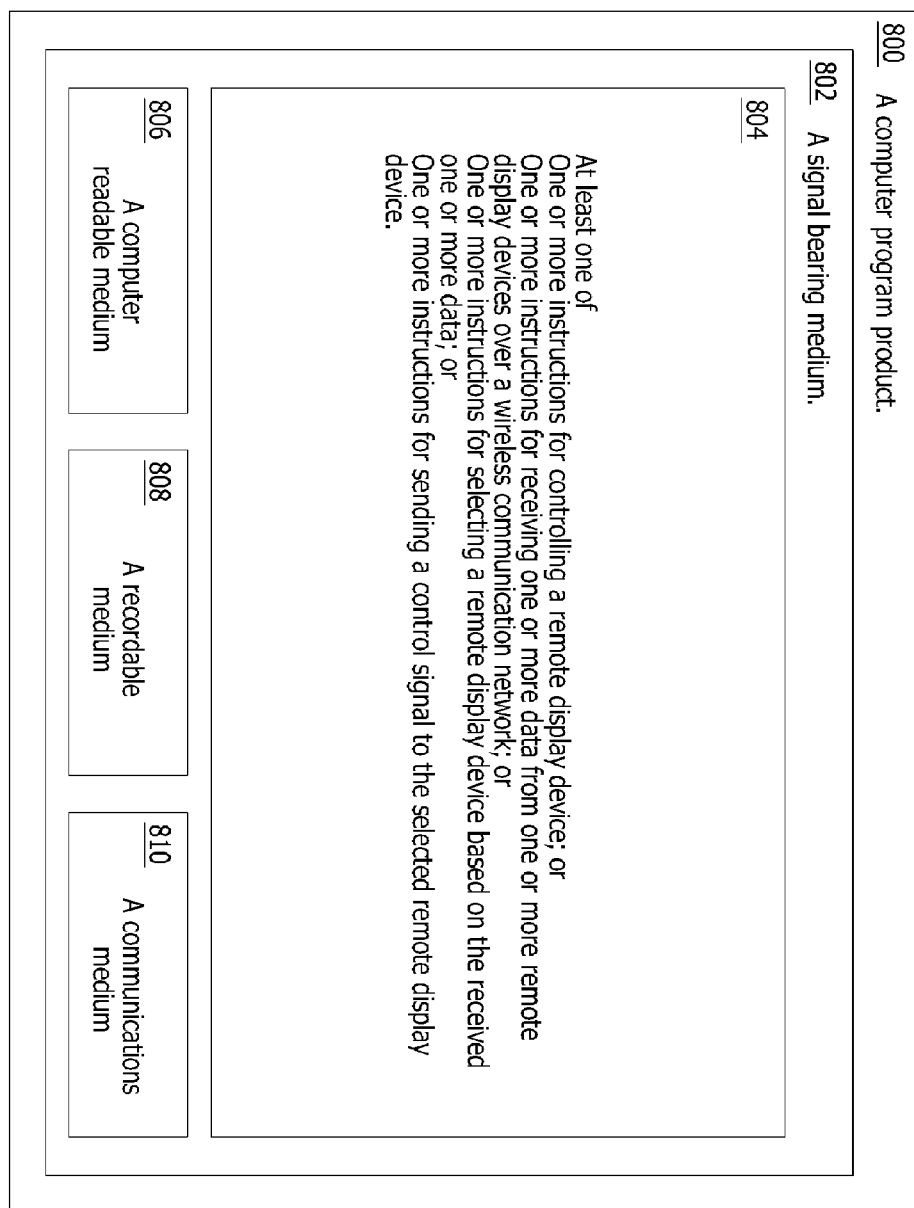
FIG. 7 illustrates computer program products implementing remote display control.

FIG. 7 illustrates computer program products 800 implementing remote display control arranged according to at least some embodiments described herein. Program product 800 may include a signal bearing medium 802. Signal bearing medium 802 may include one or more instructions 804 that, when executed by, for example, a processor, may provide the functionality described above with respect to FIGS. 1-6. Thus, for example, referring to system 100, one or more of processors in handheld computing device 104 may undertake one or more of the blocks shown in FIG. 6 in response to instructions 804 conveyed to handheld computing device 104 and/or display device 102 by medium 802.

In some implementations, signal bearing medium 802 may encompass a computer-readable medium 806, such as, but not limited to, a hard disk drive, a Compact Disc (CD), a Digital Video Disk (DVD), a digital tape, memory, etc. In some implementations, signal bearing medium 802 may encompass a recordable medium 808, such as, but not limited to, memory, read/write (R/W) CDs, R/W DVDs, etc. In some implementations, signal bearing medium 802 may encompass a communications medium 810, such as, but not limited to, a digital and/or an analog communication medium (e.g., a fiber optic cable, a waveguide, a wired communications link, a wireless communication link, etc.). Thus, for example, program product 800 may be conveyed to one or more modules of system 100 by an RF signal bearing medium 802, where the signal bearing medium 802 is conveyed by a wireless communications medium 810 (e.g., a wireless communications medium conforming with the IEEE 802.11 standard).

Figure 8:
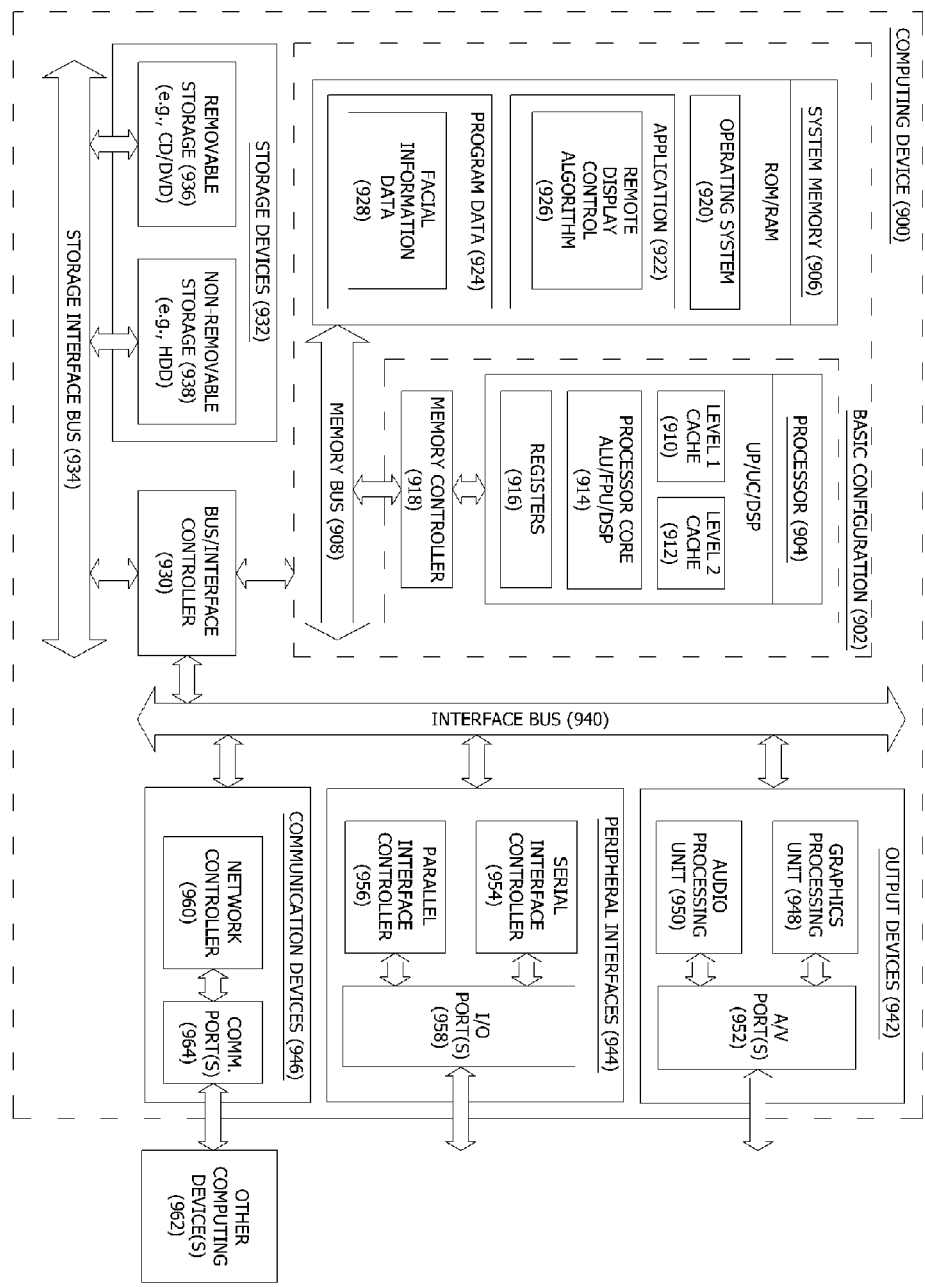
FIG. 8 is a block diagram illustrating an example computing device that is arranged for remote device control.
Figure 8:
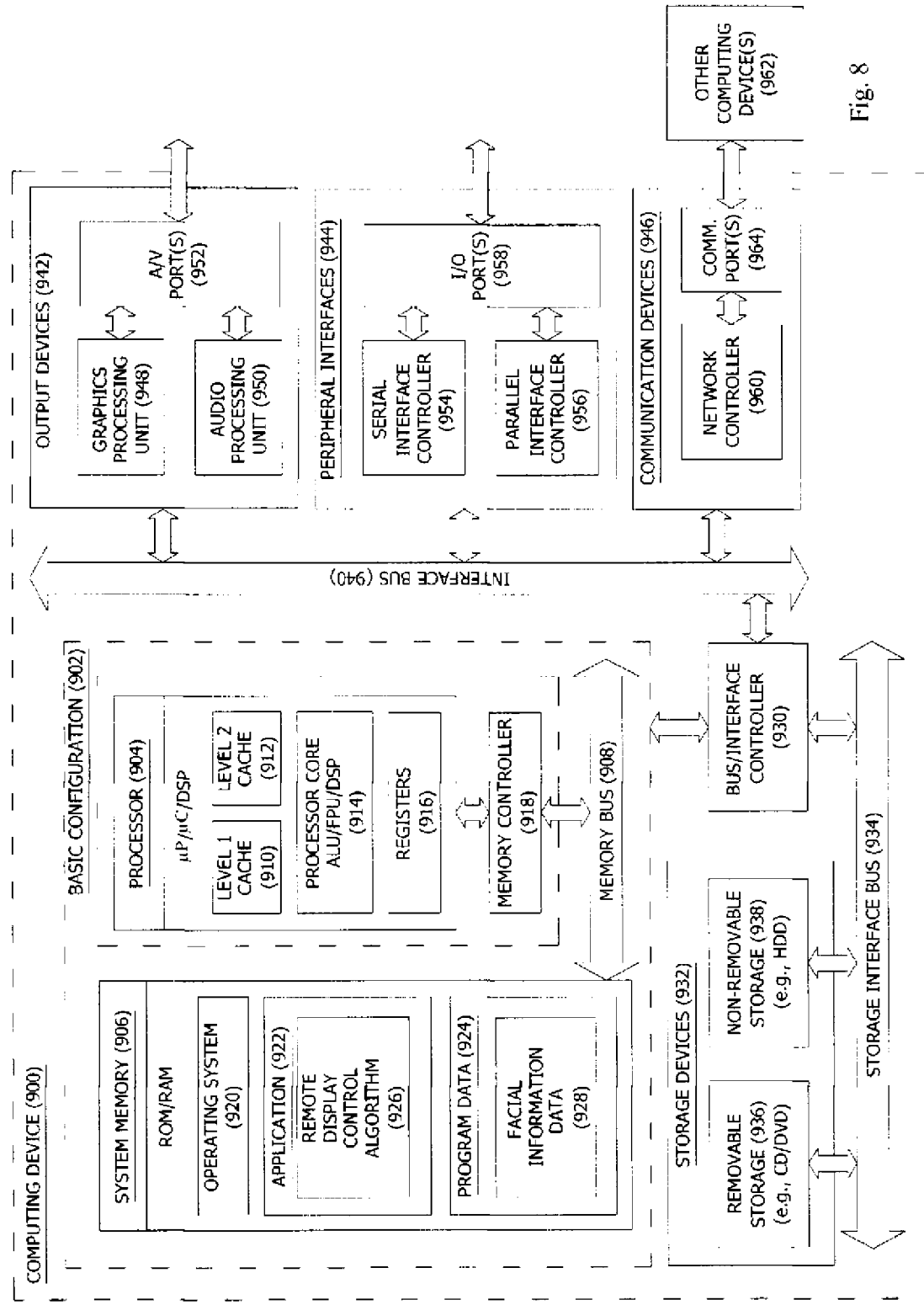

FIG. 8 is a block diagram illustrating an example computing device 900 that is arranged to implement remote display control according to at least some embodiments described herein. In a very basic configuration 902, computing device 900 typically includes one or more processors 904 and a system memory 906. A memory bus 908 may be used for communicating between processor 904 and system memory 906.

Depending on the desired configuration, processor 904 may be of any type including but not limited to a microprocessor (μP), a microcontroller (μC), a digital signal processor (DSP), or any combination thereof. Processor 904 may include one more levels of caching, such as a level one cache 910 and a level two cache 912, a processor core 914, and registers 916. An example processor core 914 may include an arithmetic logic unit (ALU), a floating point unit (FPU), a digital signal processing core (DSP Core), or any combination thereof. An example memory controller 918 may also be used with processor 904, or in some implementations memory controller 918 may be an internal part of processor 904.

Depending on the desired configuration, system memory 906 may be of any type including but not limited to volatile memory (such as RAM), non-volatile memory (such as ROM, flash memory, etc.) or any combination thereof. System memory 906 may include an operating system 920, one or more applications 922, and program data 924. Application 922 may include a remote display control algorithm 926 that is arranged to perform the functions as described herein including those described with respect to processes of FIG. 6. Program data 924 may include facial information data 928 that may be useful for operation with the remote display control algorithm as is described herein. In some embodiments, application 922 may be arranged to operate with program data 924 on operating system 920 such that implementations of convenient remote display control may be provided as described herein. This described basic configuration 902 is illustrated in FIG. 8 by those components within the inner dashed line.

Computing device 900 may have additional features or functionality, and additional interfaces to facilitate communications between basic configuration 902 and any required devices and interfaces. For example, a bus/interface controller 930 may be used to facilitate communications between basic configuration 902 and one or more data storage devices 932 via a storage interface bus 934. Data storage devices 932 may be removable storage devices 936, non-removable storage devices 938, or a combination thereof. Examples of removable storage and non-removable storage devices include magnetic disk devices such as flexible disk drives and hard-disk drives (HDD), optical disk drives such as compact disk (CD) drives or digital versatile disk (DVD) drives, solid state drives (SSD), and tape drives to name a few. Example computer storage media may include volatile and nonvolatile, removable and non-removable media implemented in any method or technology for storage of information, such as computer readable instructions, data structures, program modules, or other data.

System memory 906, removable storage devices 936 and non-removable storage devices 938 are examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which may be used to store the desired information and which may be accessed by computing device 900. Any such computer storage media may be part of computing device 900.

Computing device 900 may also include an interface bus 940 for facilitating communication from various interface devices (e.g., output devices 942, peripheral interfaces 944, and communication devices 946) to basic configuration 902 via bus/interface controller 930. Example output devices 942 include a graphics processing unit 948 and an audio processing unit 950, which may be configured to communicate to various external devices such as a display or speakers via one or more A/V ports 952. Example peripheral interfaces 944 include a serial interface controller 954 or a parallel interface controller 956, which may be configured to communicate with external devices such as input devices (e.g., keyboard, mouse, pen, voice input device, touch input device, etc.) or other peripheral devices (e.g., printer, scanner, etc.) via one or more I/O ports 958. An example communication device 946 includes a network controller 960, which may be arranged to facilitate communications with one or more other computing devices 962 over a network communication link via one or more communication ports 964.

The network communication link may be one example of a communication media. Communication media may typically be embodied by computer readable instructions, data structures, program modules, or other data in a modulated data signal, such as a carrier wave or other transport mechanism, and may include any information delivery media. A "modulated data signal" may be a signal that has one or more of its characteristics set or changed in such a manner as to encode information in the signal. By way of example, and not limitation, communication media may include wired media such as a wired network or direct-wired connection, and wireless media such as acoustic, radio frequency (RF), microwave, infrared (IR) and other wireless media. The term computer readable media as used herein may include both storage media and communication media.

Computing device 900 may be implemented as a portion of a small-form factor portable (or mobile) electronic device such as a cell phone, a personal data assistant (PDA), a personal media player device, a wireless web-watch device, a personal headset device, an application specific device, or a hybrid device that include any of the above functions. Computing device 900 may also be implemented as a personal computer including both laptop computer and non-laptop computer configurations.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds compositions or biological systems, which can, of course, vary. It is also to be understood that the terminology used herein is for the purpose of describing particular embodiments only, and is not intended to be limiting.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," "greater than," "less than," and the like include the number recited and refer to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

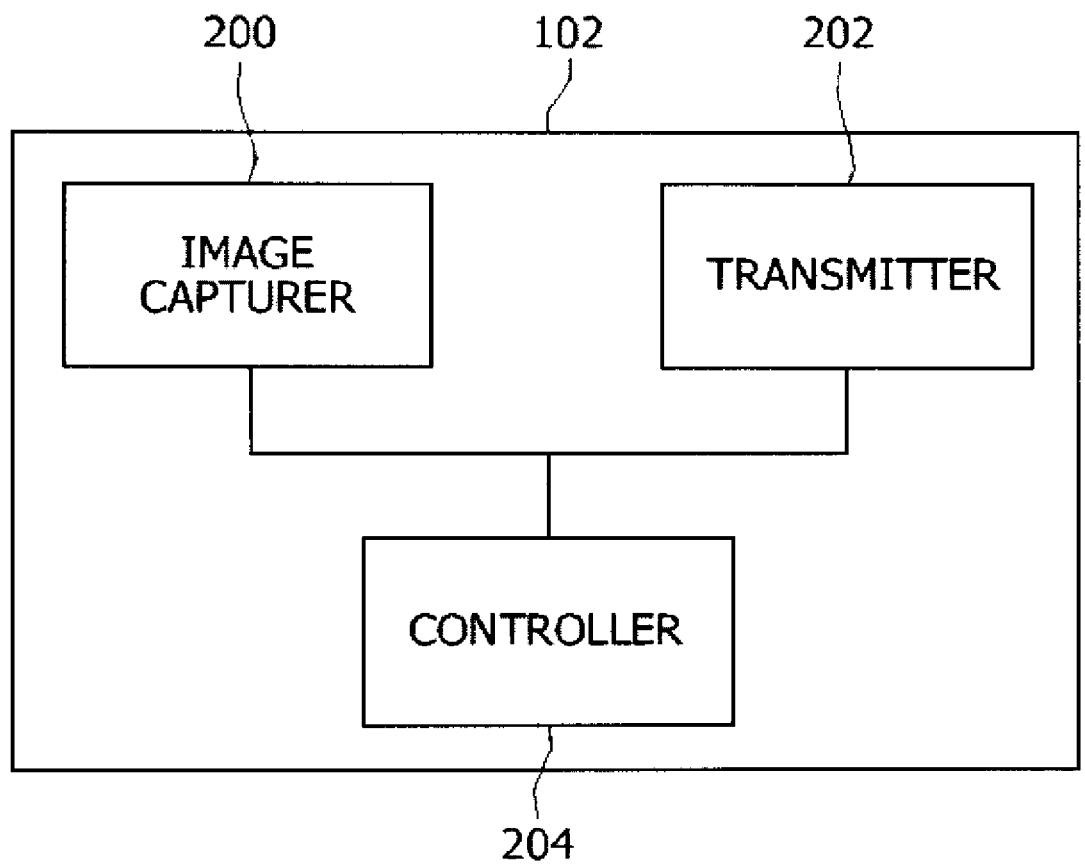

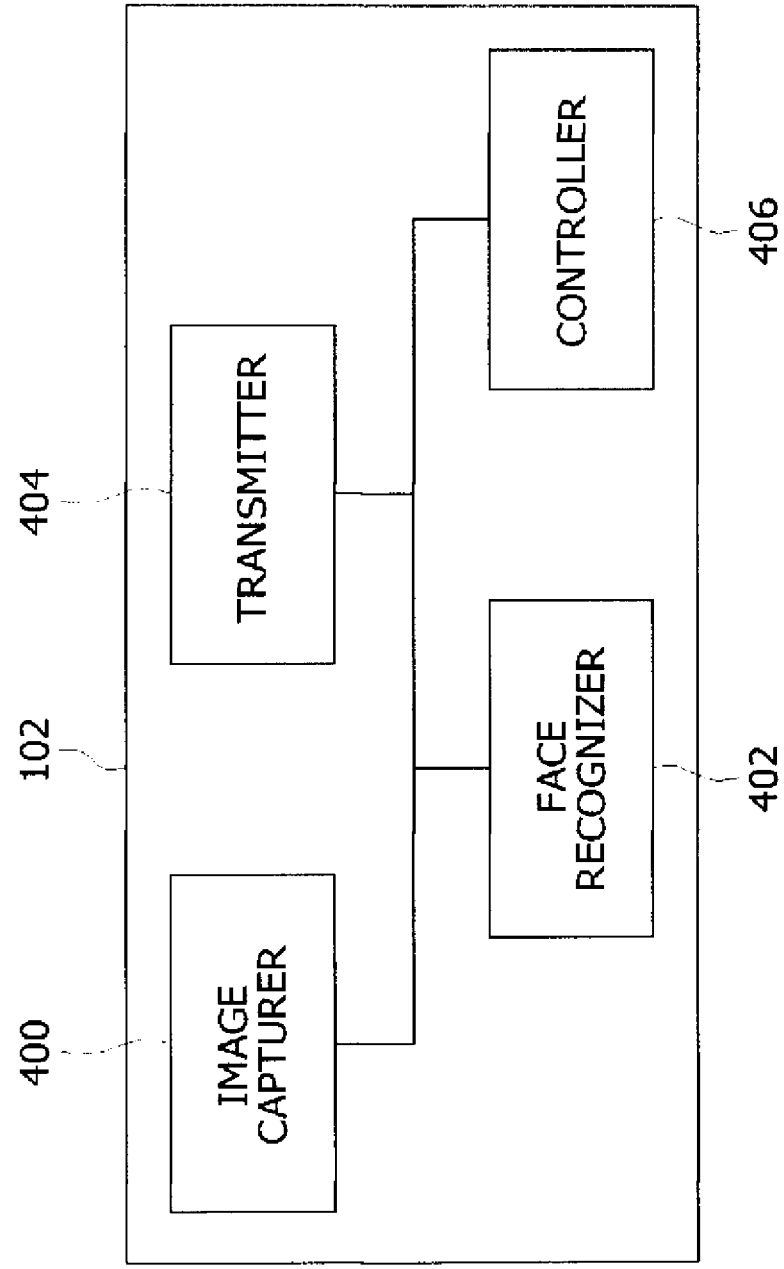

What is claimed is:

1. A method for controlling a remote display device using a handheld computing device, comprising:
   receiving, by a handheld computing device, data from one or more remote display devices over a wireless communication network, the data received from one of the one or more remote display devices comprising at least one of the group consisting of: an image of a user of the handheld computing device captured by the one of the one or more remote display devices, and facial information extracted from an image of the user of the handheld device captured by the one of the one or more remote display devices;

selecting, by the handheld computing device, a remote display device of the one or more remote display devices based on the data received from the one or more remote display devices; and sending, by the handheld computing device, a control signal to the selected remote display device.

2. The method of claim 1, wherein the received data further include identification information of the respective one or more remote display devices.

3. The method of claim 1, wherein selecting the remote display device further comprises:

extracting facial information from each of the received images; and selecting a remote display device based on a comparison of the extracted facial information from each of the received images with facial information stored on the handheld computing device.

4. The method of claim 1, wherein the received data comprise facial information extracted from one or more images respectively captured by the one or more remote display devices.

5. The method of claim 4, wherein selecting the remote display device comprises selecting a remote display device based on a match of the facial information extracted from the one or more images received from the one or more remote display devices and facial information stored on the handheld computing device.

6. The method of claim 1, further comprising, prior to sending the control signal, displaying on the handheld computing device a control interface suitable to control the selected remote display device.

7. The method of claim 6, wherein the control interface is received from the selected remote display device.

8. A handheld computing device, comprising:

a receiver configured to receive one or more images from one or more remote display devices over a wireless communication network, each of the received images comprising an image of a user of the handheld computing device captured by the one or more remote display devices;

a face recognizer configured to extract facial information from each of the received images;

a selector configured to select a remote display device based on a comparison of the extracted facial information from each of the received images with facial information stored on the handheld computing device; and a display device controller configured to transmit a control signal to the selected remote display device.

9. The device of claim 8, wherein the display device controller is further configured to display on the handheld computing device a control interface suitable to control the selected remote display device.

10. The device of claim 9, wherein the control interface is received from the selected remote display device.

11. A computing device, comprising:

a receiver configured to receive facial information from one or more remote display devices over a wireless communication network, the facial information comprising facial information about a user of the computing device, wherein the facial information from the one or more remote display devices is extracted from one or more images respectively captured by the one or more remote display devices;

a selector configured to select a remote display device based on a match of the facial information from the one or more remote display devices and facial information stored on the computing device; and a display device controller configured to send a control signal to the selected remote display device.

12. The device of claim 11, wherein the display device controller is further configured to display a control interface suitable to control the selected remote display device.

13. The device of claim 12, wherein the control interface is received from the selected remote display device.

14. A display device, comprising:

an image capturer configured to capture an image with a camera;

a transmitter configured to transmit the image for reception by a handheld computing device, the image comprising an image of a user of the handheld computing device, wherein the handheld computing device is configured to select a remote display device based on an image of the user of the handheld computing device captured by the remote display device; and a controller configured to receive a control signal from the handheld computing device, and further configured to control the display device based on the control signal.

15. The device of claim 14, wherein the transmitter is configured to transmit identification information of the display device to the handheld computing device in addition to the image.

16. The device of claim 14, wherein the controller is configured to transmit a control interface suitable to control the display device to the handheld computing device.

17. The device of claim 14, further comprising a face recognizer configured to extract facial information from the image, and wherein the transmitter is configured to transmit the extracted facial information to the handheld computing device.

* * * * *

UNITED STATES PATENT AND TRADEMARK OFFICE
CERTIFICATE OF CORRECTION

Page 1 of 4

PATENT NO.      : 8,866,587 B2
APPLICATION NO. : 12/999130
DATED           : October 21, 2014
INVENTOR(S)     : Chang It is certified that error appears in the above-identified patent and that said Letters Patent is hereby corrected as shown below:

In the Drawings

Sheet 1 of 5, FIG. 2 should appear as shown on attached sheet.

Sheet 2 of 5, FIG. 4 should appear as shown on attached sheet.

Sheet 5 of 5, Fig. 8 should appear as shown on attached sheet.

Signed and Sealed this
Sixth Day of October, 2015

Michelle K. Lee
*Director of the United States Patent and Trademark Office*